(No Model.) 2 Sheets—Sheet 2.
L. L. BUCK.
WATER MOTOR, PUMP, &c.

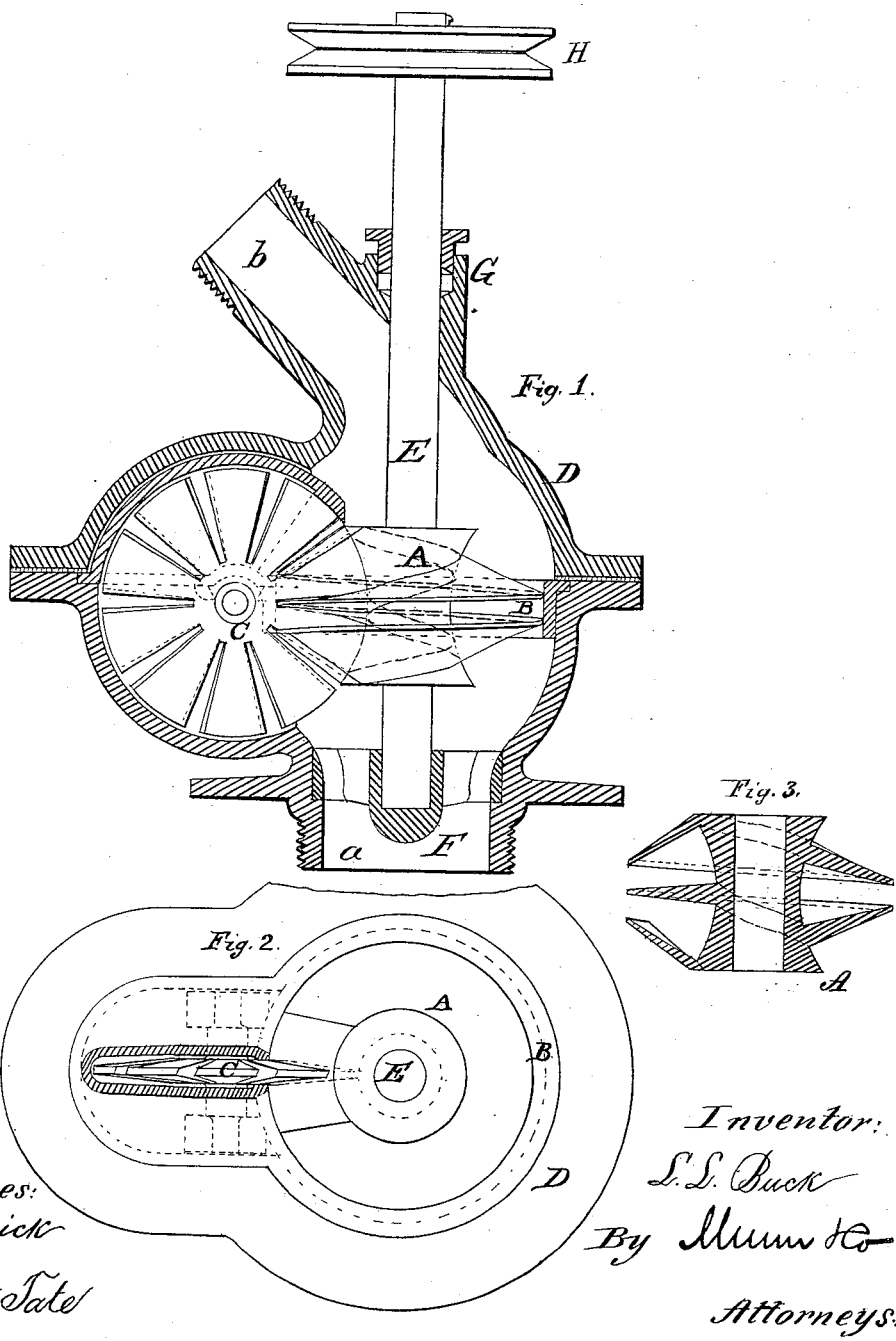

No. 265,381. Patented Oct. 3, 1882.

UNITED STATES PATENT OFFICE.

LEFFERT L. BUCK, OF NEW YORK, N. Y.

WATER-MOTOR, PUMP, &c.

SPECIFICATION forming part of Letters Patent No. 265,381, dated October 3, 1882.

Application filed April 22, 1882. (No model.)

*To all whom it may concern:*

Be it known that I, LEFFERT L. BUCK, of the city, county, and State of New York, have invented a new and Improved Water-Motor, Pump, and Water-Meter, of which the following is a full, clear, and exact description.

Reference is to be had to the accompanying drawings, forming part of this specification, in which similar letters of reference indicate corresponding parts in all the figures.

Figure 4:
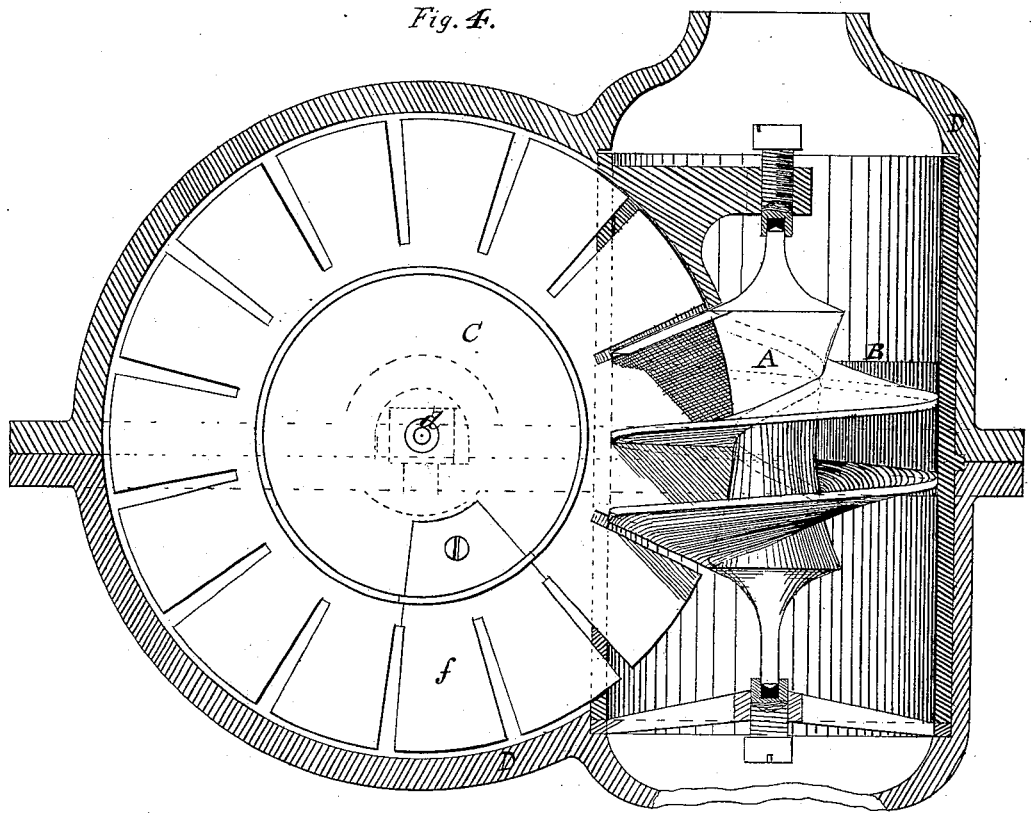
Figure 5:
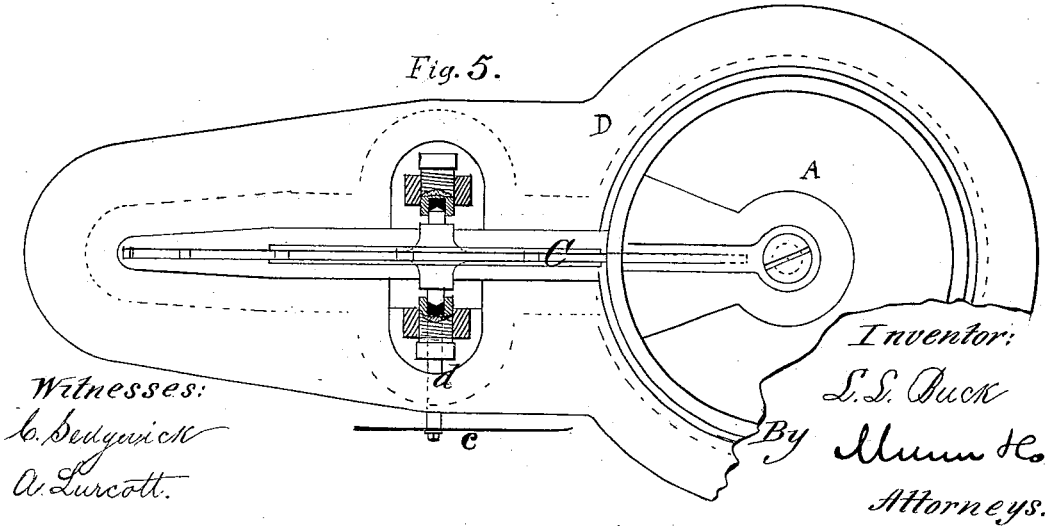

Figure 1 is a vertical transverse section of my improved machine as arranged for a water-motor or pump. Fig. 2 is a plan view with a portion of the casing removed, and Fig. 3 is a section of the screw. Fig. 4 is a side sectional elevation of my machine arranged for a water-meter, and Fig. 5 is a plan view of the same with one-half of the casing removed to show internal working parts.

The object of my invention is to construct a machine which may be adapted to be used as a pump, a water-motor, or a water-meter; and the invention consists in the combination of a screw of peculiar form with a wheel whose wings work in the threads of the screw, all of the working parts being inclosed in a metallic casing having suitable induction and eduction orifices for the reception and discharge of the water or other liquid.

The machine, as shown in Figs. 1 and 2, is arranged for a pump or water-motor. The screw A is fitted to revolve in a cylinder, B, having in one side a longitudinal slot for receiving the wheel C. The wheel C has radial slots, in which the thread of the screw A is received. The concave sides of the boss or body of the screw A correspond in curvature to the periphery of the wheel C, and the spaces between the threads of the screw correspond to the sector-shaped teeth or wings of the wheel C, so that the wheel and the screw entirely close the cylinder B. The cylinder B is inclosed in a casing, D, which also incloses the wheel C, and in which the journals of the screw and of the wheel have their bearings at right angles to each other. The shaft E of the screw rests in a step, F, at the bottom of the casing, and its upper end extends through a stuffing-box, G, at the top of the casing, and is provided with a wheel, H, or other device for imparting motion. The casing D has a supply-opening, $a$, and a discharge-opening, $b$. The wheel C is so placed that its plane, if produced, would lie in the axis of screw A. The perimeter of wheel C fits closely to the body of screw A, which is of such shape as to be at all times nearly in contact with a portion of the circumference of the wheel C. The slots in wheel C are radial from its center, and have a pitch equal to that of the thread of screw A. The thread of screw A is formed so that any plane which includes the axis of the screw will intersect the thread in lines converging toward the center of wheel, thus permitting the thread to fill all the slits of that portion of the wheel C which projects within the cylinder B. The thread is of sufficient length to extend a little over twice around the body of the screw A, and consequently will fill at least two slits of the wheel C. Hence the spaces above and below the screw A have no communication, except as the screw A is revolved. As shown in Fig. 1, the screw has a right-hand thread, and by turning it to the right the water will be forced upward. It is to be operated by applying power to the end of the shaft of the screw. By reversing the operation—that is, by forcing the water into the cylinder—the screw A will be revolved by the pressure of the water, and the power thus obtained is to be transmitted as required by means of the shaft of screw A. For the purpose of a meter the screw A and wheel C are to be made very light, the parts well fitted, and the pivots of both screw and wheel delicately made and inclosed in the casing, as shown in Figs. 4 and 5, so as to move with the slightest pressure. The indicator $c$, for showing the discharge, will be attached to the shaft $d$ of wheel C, as shown in Fig. 5. By having two screws on the same shaft, one with a right-hand thread and the other a left-hand thread, and providing a separate wheel for each screw, water will be drawn into each end of the cylinder and forced out through an opening made in the side of the cylinder between the two screws. With this arrangement the pressure on its screws will be equal and in opposite directions. They will consequently balance each other and avoid the friction of a step. The wheel C is provided with a removable section, $f$, Fig. 4, to permit of putting the machine together. The blank space made by removing two of the teeth or wings of the wheel C admits of placing the wheel in the casing, after which, by turning the screw and wheel so as to bring two of the fixed teeth into engagement with the screw, the removable section may be replaced, making the whole complete.

Having thus fully described my invention, what I claim as new, and desire to secure by Letters Patent, is—

1. In a rotary pump, water-wheel, or meter, a disk or wheel, C, provided with radial straight-edged slits, in combination with a hub, A, provided with a screw-threaded concave surface, corresponding in curvature to the periphery of wheel C, and said screw-thread being of irregular pitch and slant to continually fit said radial slits in the wheel, while both revolve, as shown and described.

2. The combination of the concave-surfaced screw-threaded hub A with the radially-slitted wheel C, lying in the plane of the axis of the hub A, as shown and described.

LEFFERT L. BUCK.

Witnesses:
GEO. M. HOPKINS,
C. SEDGWICK.